United States Patent
Ishii et al.

(10) Patent No.: US 9,703,732 B2
(45) Date of Patent: Jul. 11, 2017

(54) INTERFACE APPARATUS AND MEMORY BUS SYSTEM

(71) Applicant: Panasonic Intellectual Property Management Co., Ltd., Osaka (JP)

(72) Inventors: Tomoki Ishii, Kyoto (JP); Takao Yamaguchi, Osaka (JP); Atsushi Yoshida, Osaka (JP); Satoru Tokutsu, Saitama (JP); Nobuyuki Ichiguchi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 361 days.

(21) Appl. No.: 14/530,971

(22) Filed: Nov. 3, 2014

(65) Prior Publication Data

US 2015/0052283 A1   Feb. 19, 2015

Related U.S. Application Data

(63) Continuation of application No. PCT/JP2013/006841, filed on Nov. 21, 2013.

(30) Foreign Application Priority Data

Feb. 19, 2013  (JP) ................. 2013-029934

(51) Int. Cl.
G06F 13/16  (2006.01)
G06F 13/42  (2006.01)

(52) U.S. Cl.
CPC ...... *G06F 13/1621* (2013.01); *G06F 13/1657* (2013.01); *G06F 13/1689* (2013.01); *G06F 13/4282* (2013.01); *G06F 2213/0038* (2013.01)

(58) Field of Classification Search
CPC .............. G06F 3/0655; G06F 3/0659; G06F 2003/0697; G06F 9/4881; G06F 9/4887;
(Continued)

(56) References Cited

U.S. PATENT DOCUMENTS 6,609,149 B1 *  8/2003  Bandera ............ H04N 21/2182
                                                            348/E5.008
6,674,720 B1  1/2004  Passint et al.
(Continued)

FOREIGN PATENT DOCUMENTS

JP          5036920 B       7/2012
JP        2013-021452 A     1/2013
WO      WO 2005/045727 A2   5/2005

OTHER PUBLICATIONS

International Search Report for corresponding International Application No. PCT/JP2013/006841 dated Feb. 25, 2014.
(Continued)

*Primary Examiner* — Thomas J Cleary
(74) *Attorney, Agent, or Firm* — Renner, Otto, Boisselle & Sklar, LLP.

(57) ABSTRACT

An exemplary interface apparatus according to the present disclosure connects together an initiator and a packet exchange type bus network formed on the integrated circuit. In the bus network, if the initiator has submitted request data with a deadline time specified, the initiator receives, by the deadline time, response data to be issued by a node in response to the request data. The interface apparatus includes: a correcting circuit which corrects the deadline time of the request data according to the timing when the request data has been submitted, thereby generating corrected deadline time information; a header generator which generates a packet header that stores the corrected deadline time information; and a packetizing processor which generates a request packet based on the request data and the packet header.

19 Claims, 17 Drawing Sheets

(58) Field of Classification Search
CPC .......... G06F 13/12; G06F 13/14; G06F 13/16; G06F 13/1605; G06F 13/161; G06F 13/1621; G06F 13/1626; G06F 13/1642; G06F 13/1657; G06F 13/1689; G06F 13/4282; G06F 2213/0038
See application file for complete search history.

(56) References Cited

U.S. PATENT DOCUMENTS

| | | | | |
|---|---|---|---|---|
| 6,791,992 | B1* | 9/2004 | Yun | H04L 12/5693 370/415 |
| 6,801,943 | B1* | 10/2004 | Pavan | G06F 9/4887 709/226 |
| 2002/0031086 | A1* | 3/2002 | Welin | G10L 25/78 370/229 |
| 2005/0198601 | A1* | 9/2005 | Kuang | G06F 17/5022 716/108 |
| 2007/0156996 | A1 | 7/2007 | Chung | |
| 2008/0320241 | A1* | 12/2008 | Dees | G06F 3/0613 711/151 |
| 2013/0028083 | A1 | 1/2013 | Yoshida et al. | |
| 2014/0130055 | A1* | 5/2014 | Guha | G06F 3/0604 718/104 |

OTHER PUBLICATIONS

Takuma Kogo et al., "Design and implementation of on-chip-network switch for real-time system", IEICE Technical Report, 2009, vol. 108, No. 463, pp. 49-54 and English abstract.

Shinichiro Okamura et al., "The Design of Scheduling Method Based on Data Type", IEICE Technical Report, 1999, vol. 99, No. 37, pp. 13-18 and English abstract.

* cited by examiner

FIG.5
(a) WRITE REQUEST PACKET
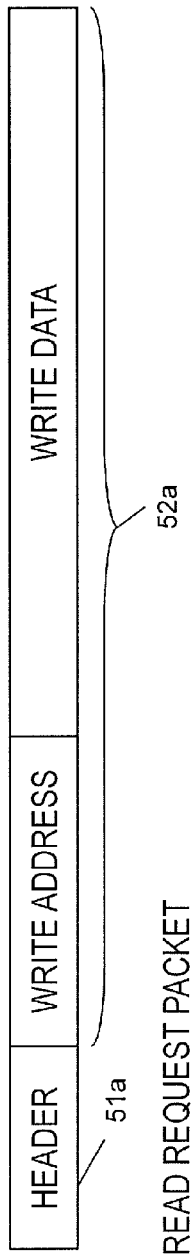
(b) READ REQUEST PACKET
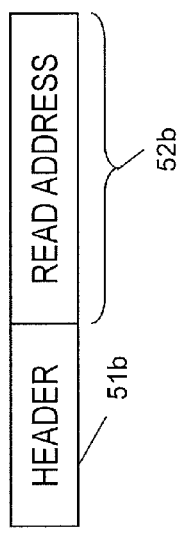
(c) WRITE RESPONSE PACKET
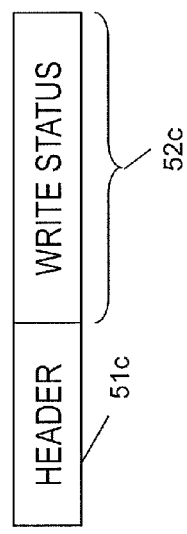
(d) READ RESPONSE PACKET
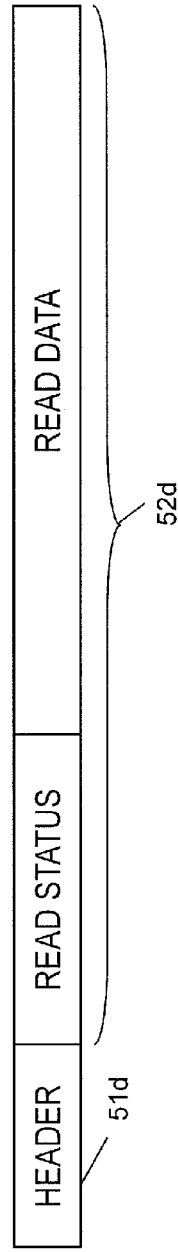

FIG.10
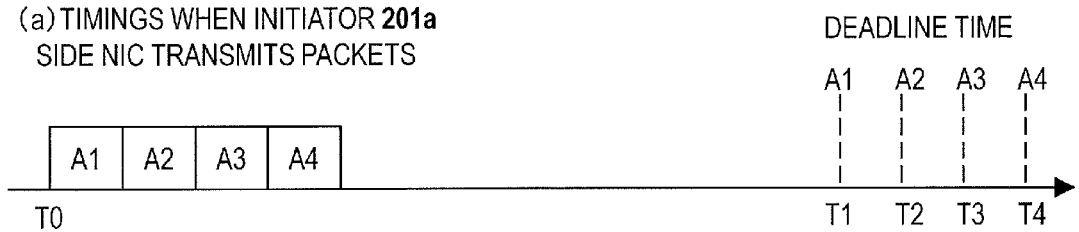
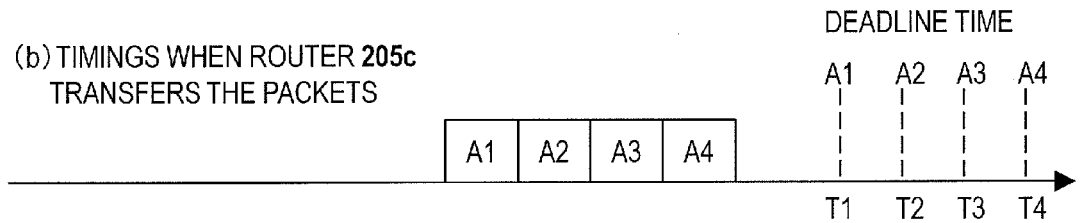

FIG.11
(a) TIMINGS WHEN INITIATOR 201a SIDE NIC TRANSMITS PACKETS
DEADLINE TIME OF PACKETS A1 TO A4
(b) TIMINGS WHEN ROUTER 205c TRANSFERS THE PACKETS
DEADLINE TIME OF PACKETS A1 TO A4
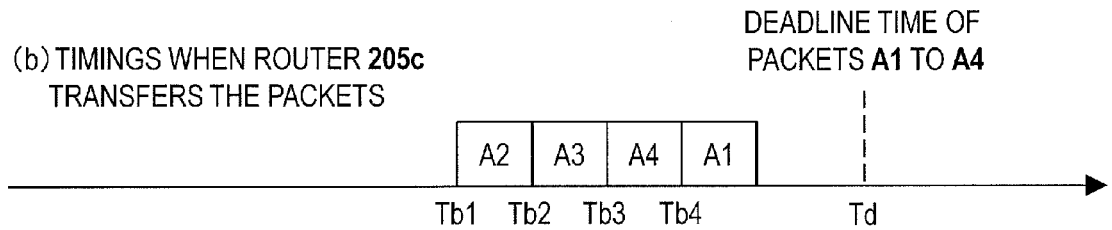

INTERFACE APPARATUS AND MEMORY BUS SYSTEM

This is a continuation of International Application No. PCT/JP2013/006841, with an international filing date of Nov. 21, 2013, which claims priority of Japanese Patent Application No. 2013-029934, filed on Feb. 19, 2013, the contents of which are hereby incorporated by reference.

BACKGROUND

1. Technical Field

The present application relates to an apparatus, method and program for controlling a networked communications bus for use in a semiconductor chip.

2. Description of the Related Art

Recently, in the fields of built-in computers and general-purpose processors which use an SoC (System on Chip), there is a growing demand for semiconductor chips with enhanced performance. And as the performance of a semiconductor chip has been enhanced these days to meet such a demand, the requested bandwidth of data to be transferred through communications buses on the chip has increased so much that the bandwidth of the communications buses needs to be increased, too. In order to broaden the bandwidth of a communications bus at a low bus operating frequency, a lot of people have paid much attention these days to a Network-on-chip (NoC) which shares a bus line between multiple processors and which can contribute to using given resources more efficiently.

In an NoC, a plurality of initiators and a memory controller may be connected together, for example. Communications between each of those initiators and the memory controller are carried out using a packet. The packet is relayed by an NoC router which is arranged on the NoC.

FIG. 1 illustrates a configuration for a general NoC router 205. This NoC router 205 includes a plurality of input and output ports and buffers are arranged on the input port end. In each of these buffers, two virtual channels (VCs) are provided for each input port.

An input packet is stored in each virtual channel (VC). By reference to the packet's destination information which is stored in the packet's header, the packet in the VC is switched and transferred by a crossbar switch to an appropriate output port. If multiple packets to be output to the same output port are stored in multiple VCs, those packets are selected and sequentially output one after another according to the arbitration rule of an arbiter. The packets that have not been selected and still left in the VCs will be provided arbitration in the next chance of transmission.

U.S. Pat. No. 6,674,720 discloses a technique for providing arbitration for packets. According to U.S. Pat. No. 6,674,720, in the header of each packet, stored is information about the amount of time that has passed since the packet was generated. If multiple packets to be switched and output are present at the same output port, a router provides arbitration by comparing the amounts of time passed in their packet headers to each other, selecting one of the packets that was generated the longest amount of time ago, and allocating that packet to the output port. In this manner, the latency of packets in the router network can be reduced and bus accesses can get done at high speeds.

SUMMARY

There is a growing demand for a technique for processing a request submitted by an initiator rightfully according to that request.

One non-limiting, and exemplary embodiment provides an interface apparatus which connects together an initiator that is arranged on an integrated circuit and a bus network that has been formed on the integrated circuit. The bus network is a packet exchange type network, and is designed so that if request data specifying a deadline time has been submitted by the initiator for a node on the bus network, response data to be issued by the node in response to the request data is received by the initiator by the deadline time. The interface apparatus includes: a correcting circuit which corrects the deadline time of the request data according to the timing when the request data has been submitted by the initiator, thereby generating corrected deadline time information; a header generator which generates a packet header that stores the corrected deadline time information; and a packetizing processor which generates a request packet based on the request data and the packet header.

According to the above aspect, it is possible to correct the deadline time of request data according to the timing when the request data has been submitted by an initiator. A corrected deadline time is set for the request data and transmitted through a bus network. As a result, the order of transmission of request data and the order of reception of response data can agree with each other with each initiator urged to respond as promptly as possible.

Since the decision can be made by the order what response data is associated with what request data, there is no need to store any packet ID in the packet header. As a result, the size of the packet header can be cut down and the overhead of data transfer can be reduced.

These general and specific aspects may be implemented using a system, a method, and a computer program, and any combination of systems, methods, and computer programs.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

Figure 1:
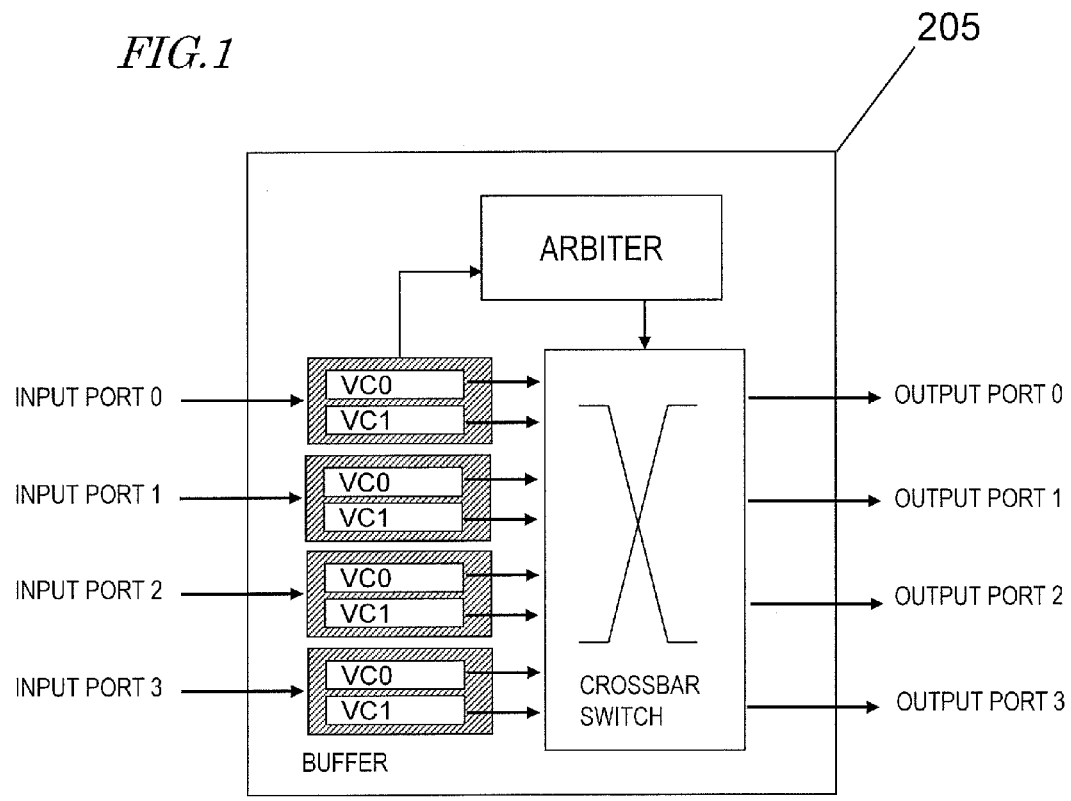
FIG. 1 illustrates a configuration for a general NoC router.
Figure 2:
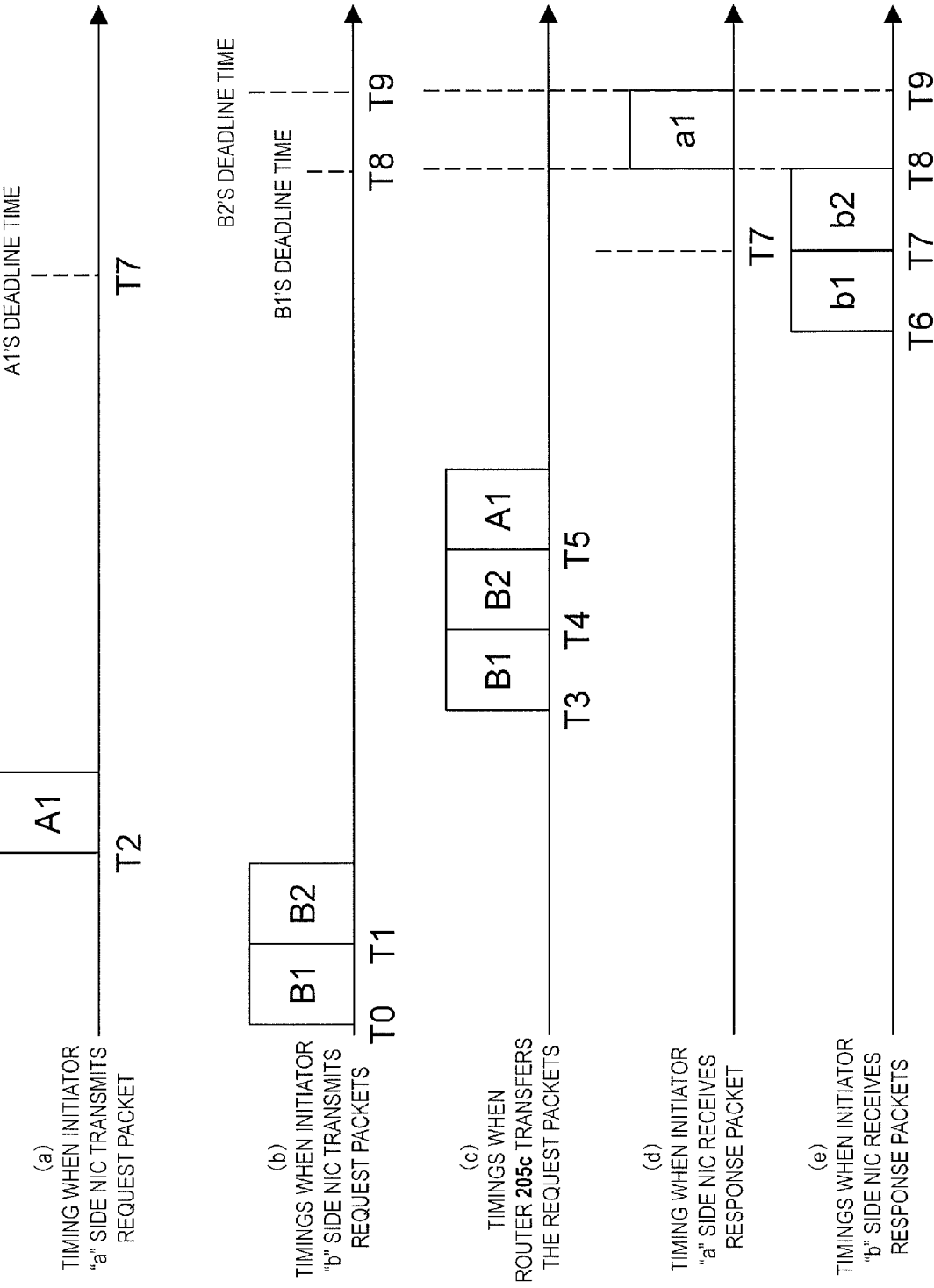

Portions (a) through (e) of FIG. 2 indicate the timings to transmit request packets from a plurality of initiator-side NICs, the timings of transfer at a router, and the timings to receive response packets at those initiator-side NICs.

Figure 3:
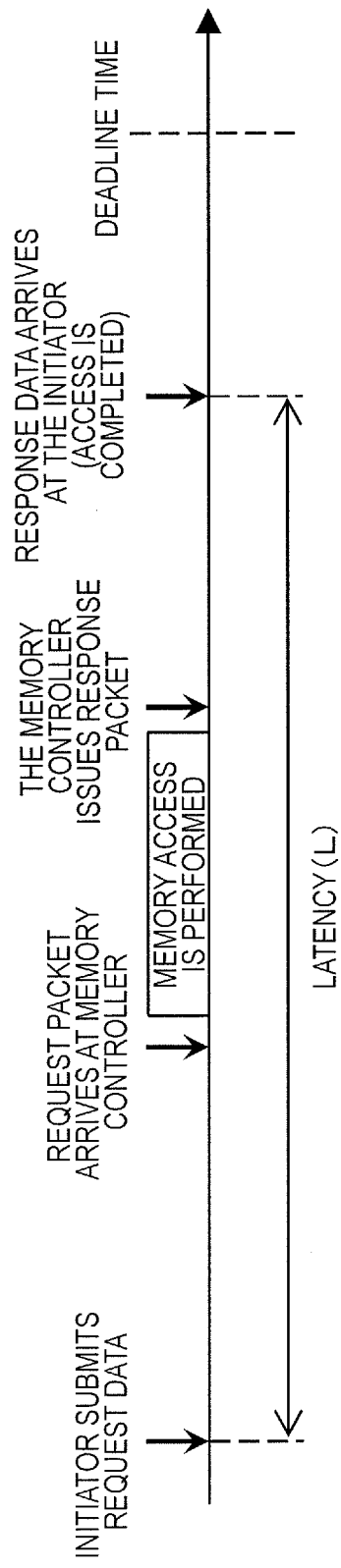

FIG. 3 illustrates how the latency L may be defined.

Figure 4:
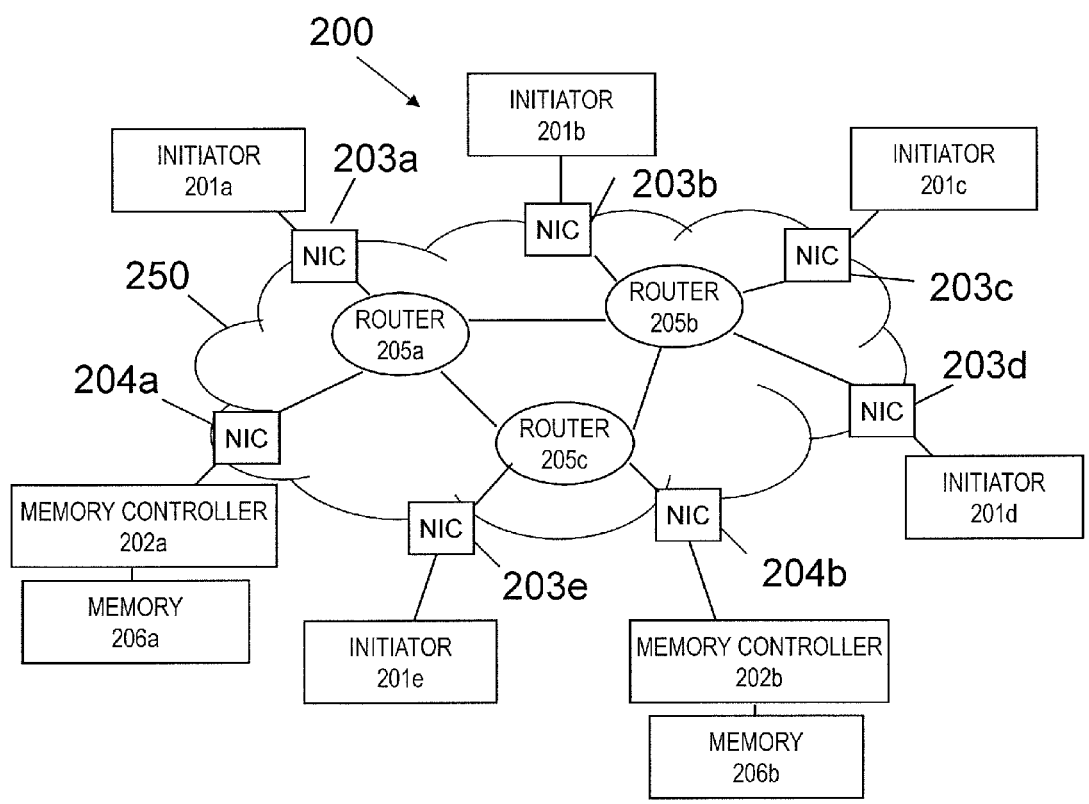

FIG. 4 illustrates the structure of an SoC 200 in which a plurality of initiators and a plurality of memories are connected together via an NoC.

Portions (a) through (d) of FIG. 5 show types and exemplary formats of packets to be transmitted and received over an NoC.

Figure 6:
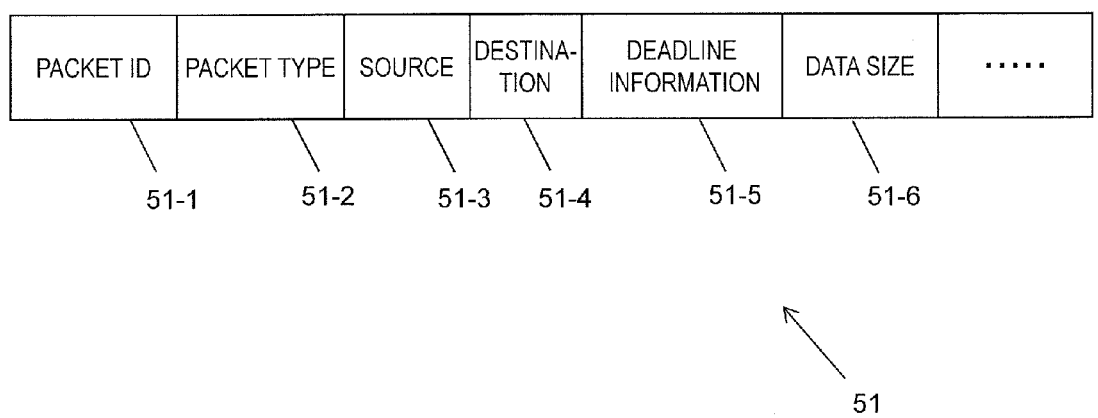

FIG. 6 illustrates an exemplary format for the packet header 51.

Figure 7:
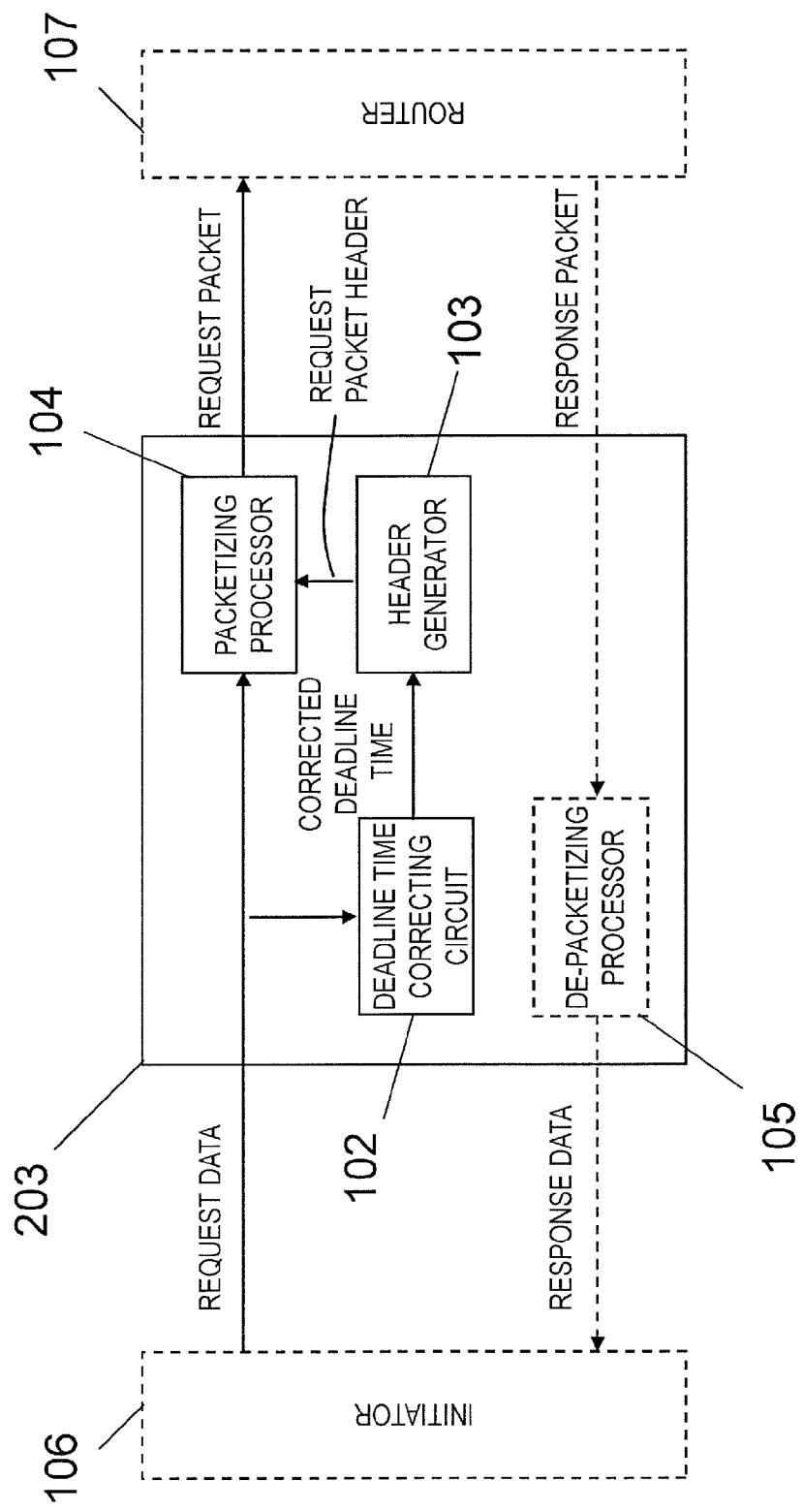

FIG. 7 illustrates a configuration for an NIC 203.

Figure 8:
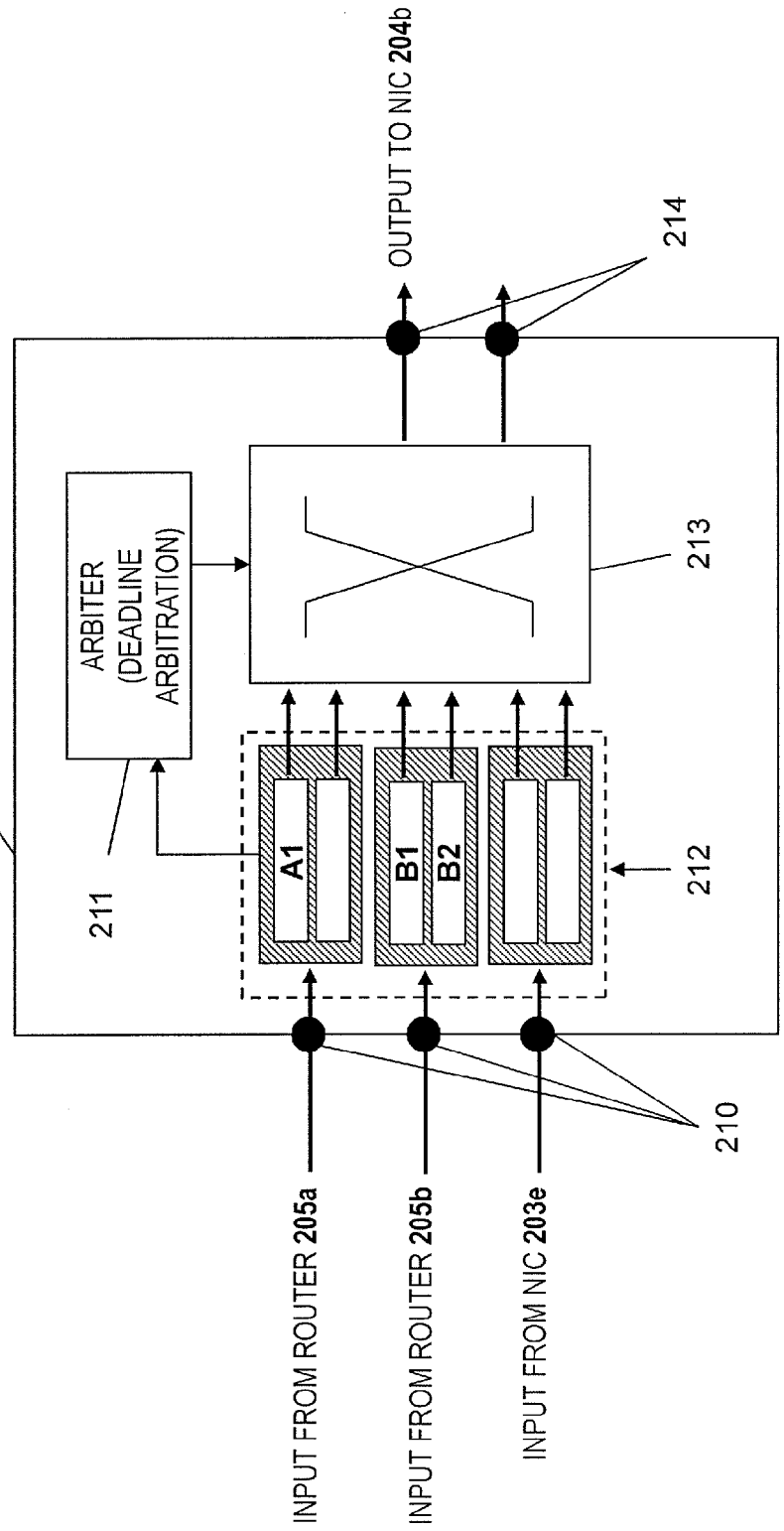

FIG. 8 illustrates a configuration for a router 205.

Figure 9:
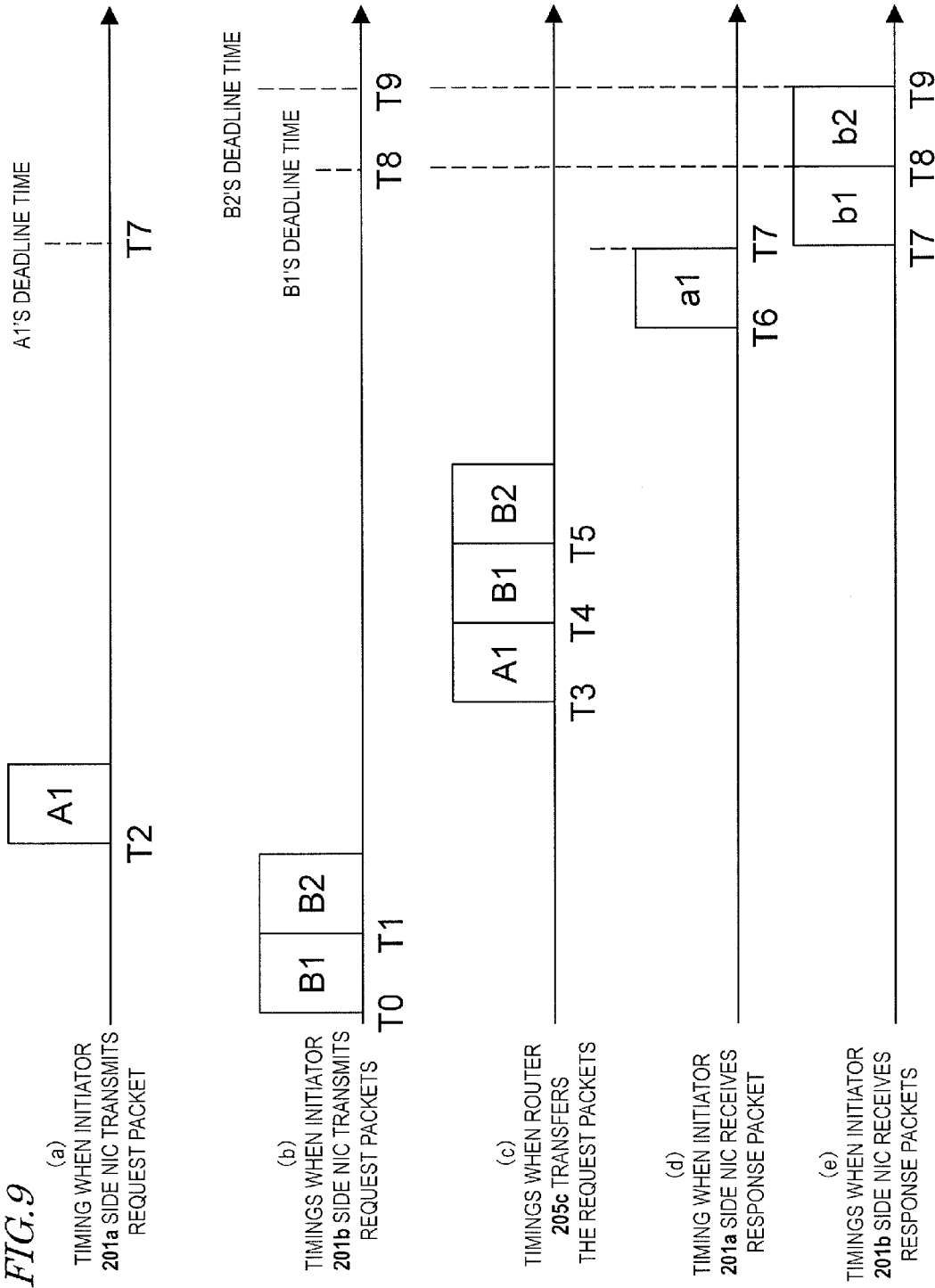

Portions (a) through (e) of FIG. 9 indicate the timings to transmit request packets from a plurality of initiator-side NICs, the timings of transfer at a router, and the timings to receive response packets at those initiator-side NICs according to an embodiment of the present disclosure.

Portion (a) of FIG. 10 shows how an initiator 201a is submitting four access request packets A1, A2, A3 and A4 for the same memory 206b and portion (b) of FIG. 10 indicates the timings for a router 205*c* to transfer the packets A1, A2, A3 and A4 to an NIC 204*b*.

Portion (a) of FIG. 11 shows how the initiator 201*a* is transmitting four request packets A1, A2, A3 and A4 with the same deadline time Td at times Ta1, Ta2, Ta3 and Ta4, respectively, and portion (b) of FIG. 11 shows in what order the four packets have been transmitted from a router 205*c* as a result of the processing described above.

Figure 12:
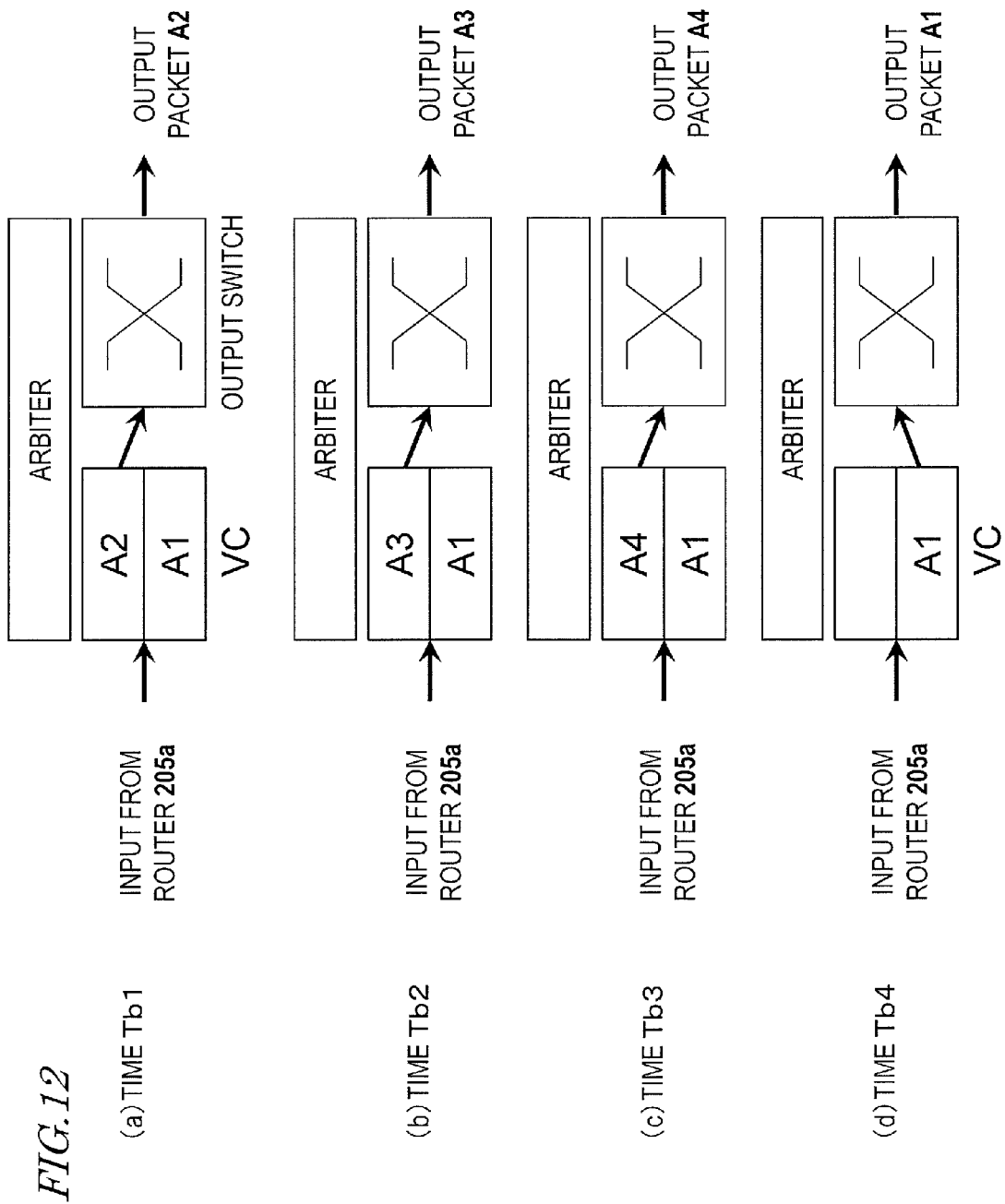

Portions (a) to (d) of FIG. 12 show how the respective virtual channels VC of the router 205*c* operate at times Tb1, Tb2, Tb3, and Tb4, respectively.

Figure 13:
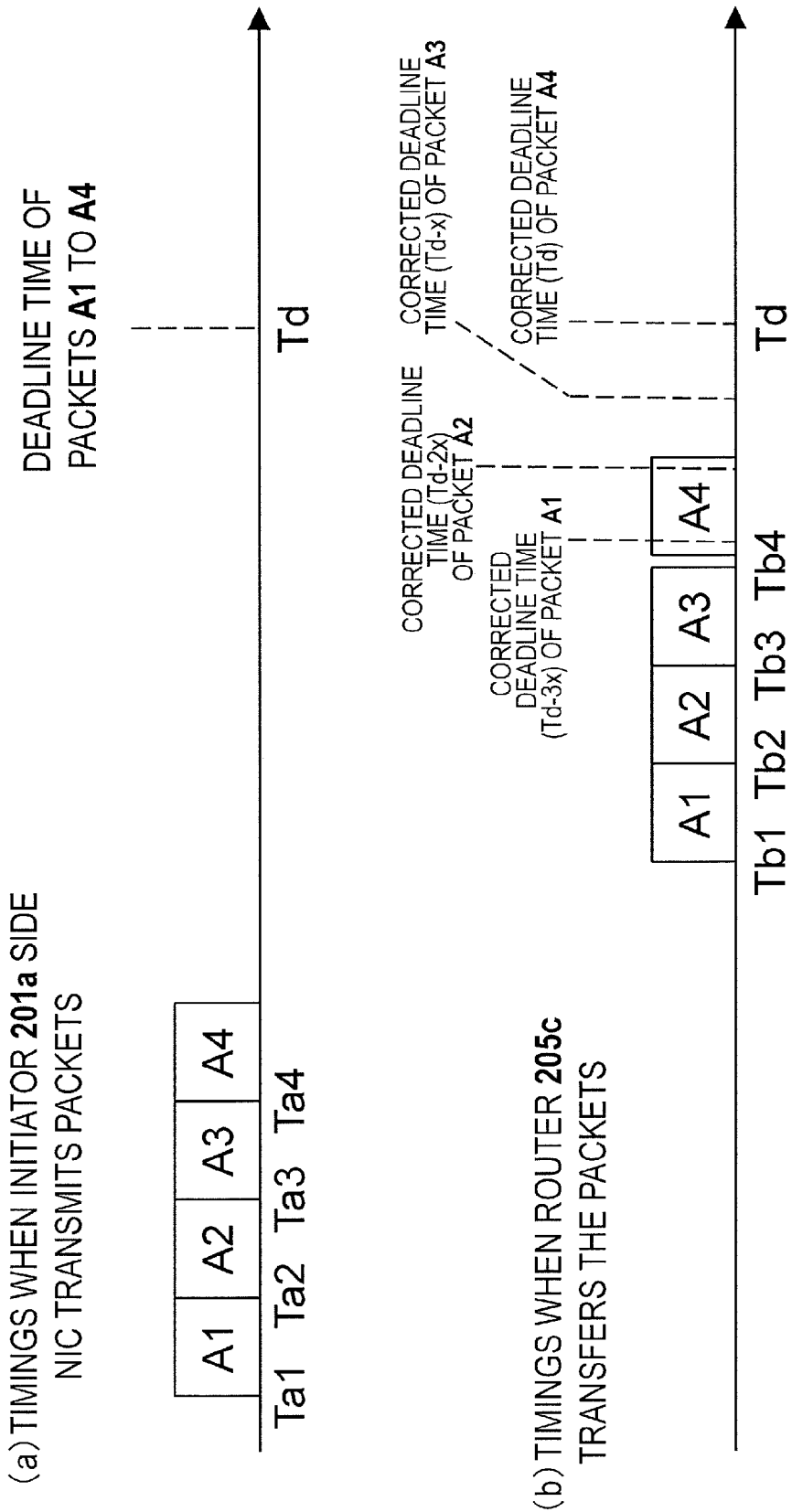

Portion (a) of FIG. 13 shows in what order a group of packets are transmitted from the NIC on the initiator 201*a* side and portion (b) of FIG. 13 shows in what order the group of packets are transferred over the bus network 250.

Figure 14:
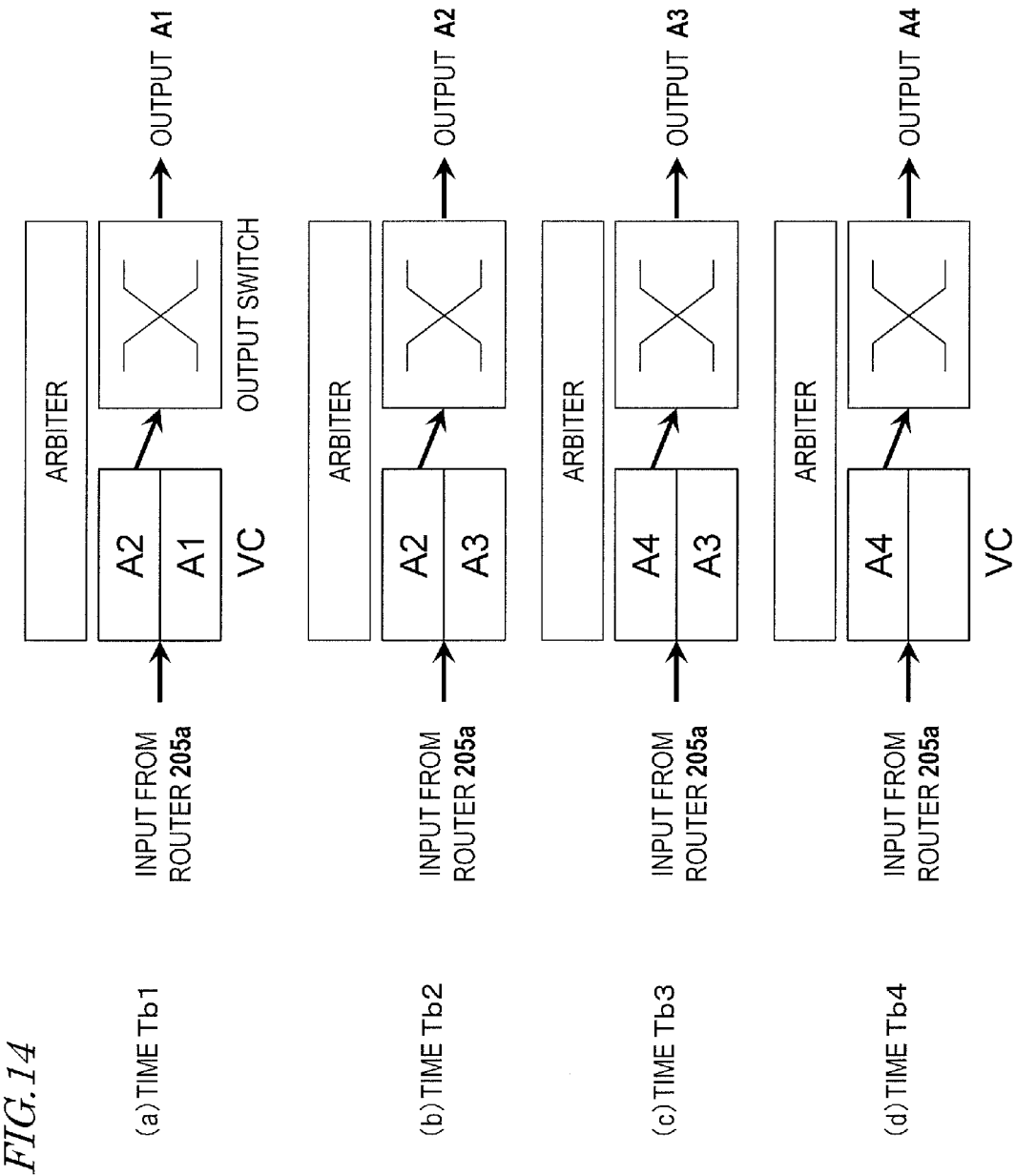

Portions (a) to (d) of FIG. 14 show how the respective virtual channels VC of the router 205*c* operate at the times Tb1, Tb2, Tb3, and Tb4 if the corrected deadline times have been set according to this embodiment.

Figure 15:
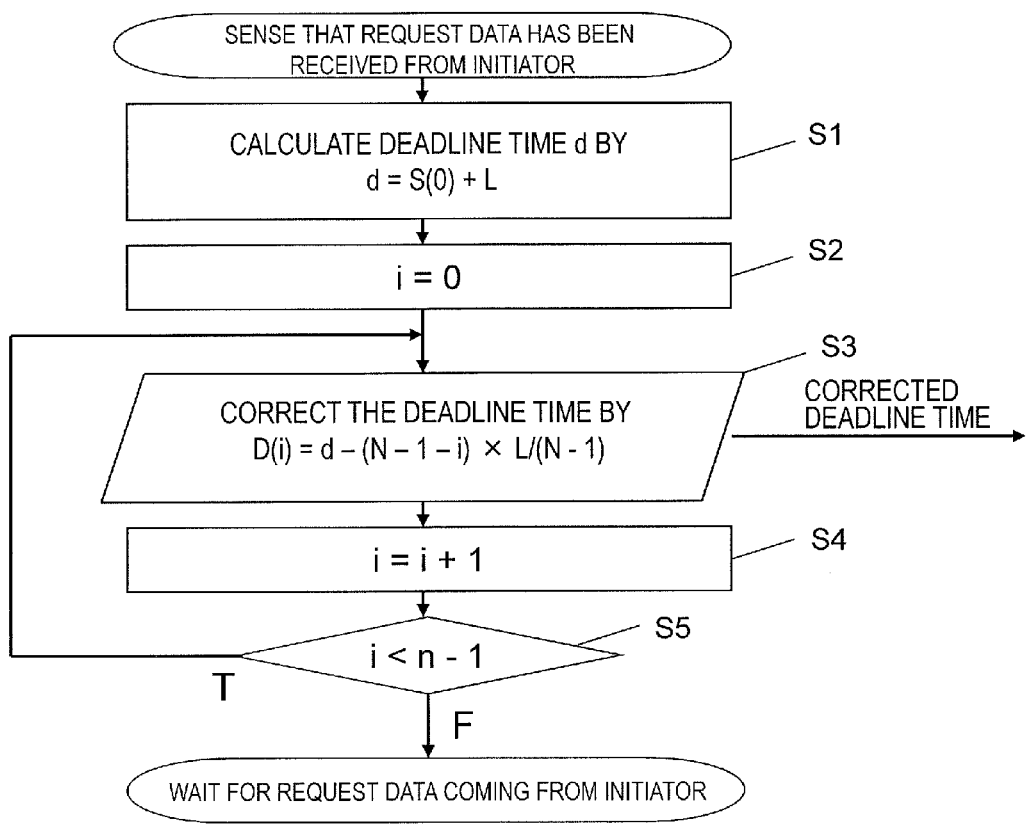

FIG. 15 shows the flow of the processing to be carried out by a correcting circuit 102.

Figure 16:
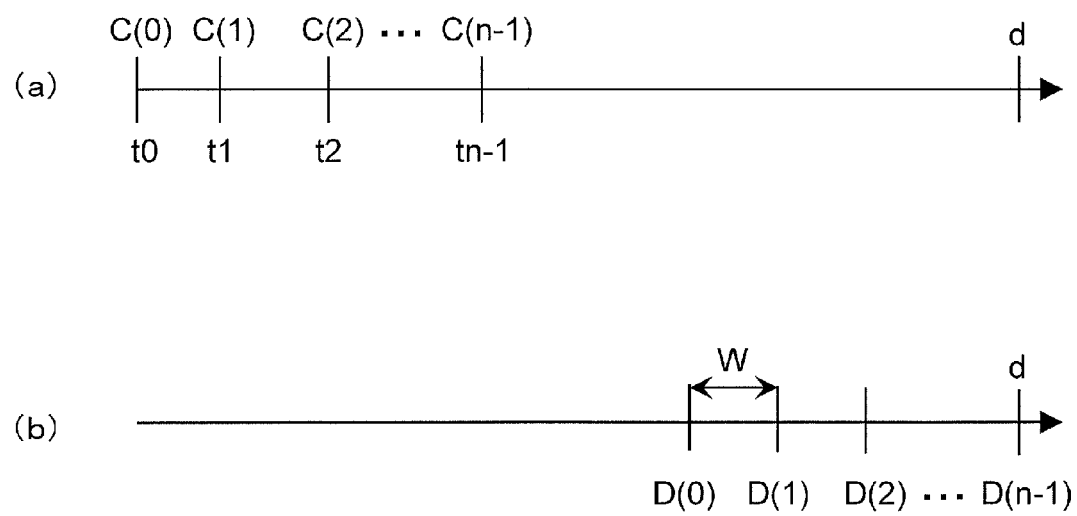

Portion (a) of FIG. 16 shows a situation where n memory access requests C(0), C(1), . . . and C(n−1) have been submitted by a bus master in this order and where all of these n request packets have the same deadline time d and portion (b) of FIG. 16 shows corrected deadline times D(0), D(1), . . . and D(n−1).

Figures 17, 18:
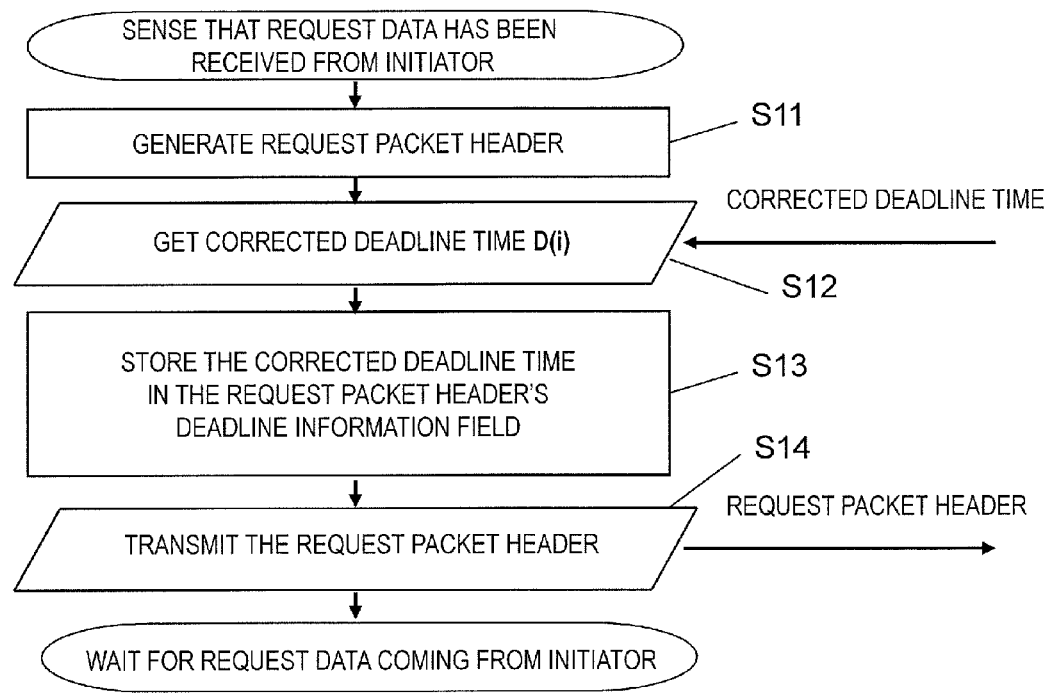

FIG. 17 shows the flow of the processing to be carried out by a header generator 103.

FIG. 18 shows an exemplary format for a request packet header that uses no packet ID.

DETAILED DESCRIPTION

The present inventors studied the problems with the conventional configuration described above.

In order to interconnect initiators and targets to be interfaced by on-chip bus protocol such as AXI, OCP or AHB to an NoC that is a packet exchange network, an interface apparatus to perform packetizing and de-packetizing is needed. Such an interface apparatus is generally called an "NIC (network interface controller)". That is to say, an NIC is provided to connect a node such as an initiator or a target and an NoC together.

Portions (a) through (e) of FIG. 2 indicate the timings to transmit request packets from a plurality of initiator-side NICs, the timings of transfer at a router, and the timings to receive response packets at those initiator-side NICs.

Portions (a) and (b) of FIG. 2 indicate the timings at which two initiator-side (i.e., initiator "a" side and initiator "b" side) NICs transmit a request packet to access a memory. Portion (c) of FIG. 2 indicates the timings at which a router on a transfer route transfers the request packets that have come from the initiator "a" side NIC and the initiator "b" side NIC. In this description, every packet is supposed to be transferred through the same output port of this router. Portions (d) and (e) of FIG. 2 indicate the timings at which the initiator "a" side NIC and initiator "b" side NIC receive access response packets from the memory. In FIG. 2, the axis of abscissas represents the passage of time. That is to say, the time advances from the left to the right.

The initiator "b" side NIC transmits two packets at times T0 and T1, respectively. The deadline times of these packets are times T8 and T9, respectively. The initiator "a" side NIC transmits a single packet at a time T2. The deadline time of that packet is a time T7.

In this description, the "deadline time" of a packet refers herein to a maximum permissible limit value with respect to the amount of time it takes for a response to that packet's request to arrive at the initiator (i.e., the latency). The deadline time is specified by the initiator.

These packets A1, B1 and B2 are stored in virtual channels of the router on the transfer route and will be transferred at the next timing of arbitration. If the route has been determined so that all of these packets A1, B1 and B2 are transferred through the same output port, the order of transfer of the packets is determined by the amounts of time that have passed since those packets were generated. That is to say, as shown in portion (c) of FIG. 2, those packets are transferred in the order of B1, B2 and A1. This means that the packet that has come from the initiator "a" side NIC that has the earliest deadline time should be processed last.

Due to such a delay of the packet A1 on the transfer route, it is not until the time T8 that the initiator "a" side NIC receives a response packet a1 that responds to the request packet A1. That is to say, the initiator "a" cannot receive the response packet a1 by the deadline time T7.

If a response has arrived at an initiator later than the deadline time, then the result of processing by that initiator can no longer be guaranteed. For example, suppose frame data with a frame rate of 60 frames per second is going to be received. An initiator which performs filtering processing on video needs to get each piece of frame data read from a memory within 1/60 seconds. That is why the deadline time with respect to a request packet requesting to read frame data from a memory is set to be within 1/60 seconds from a point in time when the request packet was submitted. However, if a response packet arrives at the initiator side NIC later than the deadline time, that initiator cannot perform video processing on each frame at the frame rate or less. As a result, the video displayed on the screen will either get frozen or have a missing part, which is an abnormal state.

If the order of transfer is determined by the amount of time passed in such a situation where respective initiators specify mutually different deadline times, sometimes a packet with an earlier deadline time may fail to satisfy the constraint on the memory access latency.

Now it will be described with reference to FIG. 3 what the "latency" means. FIG. 3 illustrates how the latency L may be defined. In this example, the latency involved with a situation where an initiator is attempting to access a memory will be described. The "latency" herein means the overall amount of time it has taken until response data, which is the result of a memory access, arrives at the initiator. The latency is calculated from a point in time when the initiator submitted a memory access request for a bus as a starting point, and includes the amount of time it has taken actually to get the memory access done. If the latency were long enough to exceed the deadline time, then the memory access could not be done in real time although the initiator demands that. As a result, as can be seen easily from the example described above, the result of the processing that should be performed by the initiator based on the data representing the result of the memory access cannot be guaranteed.

It should be noted that the deadline time is determined depending on the contents of the processing performed by the initiator, and therefore, normally changes from one request to another on a packet-by-packet basis. For example, a video processing initiator and an audio processing initiator specify mutually different deadline times with respect to an access to the same memory. For that reason, it is only natural that packets specifying mutually different deadline times be transmitted from multiple initiators such as the initiators "a" and "b" shown in FIG. 2.

An aspect of the present disclosure can be outlined as follows.

An interface apparatus according to an aspect of the present disclosure connects together an initiator that is arranged on an integrated circuit and a bus network that has been formed on the integrated circuit. The bus network is a packet exchange type network, and is designed so that if request data specifying a deadline time has been submitted by the initiator for a node on the bus network, response data to be issued by the node in response to the request data is received by the initiator by the deadline time. The interface apparatus includes: a correcting circuit which corrects the deadline time of the request data according to the timing when the request data has been submitted by the initiator, thereby generating corrected deadline time information; a header generator which generates a packet header that stores the corrected deadline time information; and a packetizing processor which generates a request packet based on the request data and the packet header.

In one embodiment, if the initiator has submitted a plurality of request data with the same deadline time specified, then the correcting circuit corrects the deadline time of each request data so that the order of submission timings of those request data is maintained.

In another embodiment, if the initiator has submitted first and second request data in this order with the same deadline time specified, then the correcting circuit corrects the deadline time of the first request data, thereby generating a first corrected deadline time which is earlier than the deadline that has been specified by the initiator, and corrects the deadline time of the second request data, thereby generating a second corrected deadline time which is later than the first corrected deadline time and which is either earlier than, or as early as, the deadline that has been specified by the initiator.

In another embodiment, the correcting circuit adopts, as the second corrected deadline time, a time which is later than the first corrected deadline time and as early as the deadline time specified by the initiator.

In another embodiment, if the initiator has submitted third request data with the same deadline time specified after having submitted the second request data, the correcting circuit adopts, as a third corrected deadline time that is a deadline time that has been corrected in response to the third request data that has been submitted most recently, a time that is as early as the deadline time specified by the initiator.

In another embodiment, the correcting circuit generates the first, second and third corrected deadline times so that the interval between the first and second corrected deadline times becomes as long as the interval between the second and third corrected deadline times.

In another embodiment, the correcting circuit adopts the first, second and third corrected deadline times so that the interval agrees with a value which has been determined in advance in the bus network.

In another embodiment, the correcting circuit generates the first, second and third corrected deadline times so that the interval between the first and second corrected deadline times becomes different from the interval between the second and third corrected deadline times.

In another embodiment, a maximum number of request data which is able to be submitted with the same deadline time specified has been defined in advance for the initiator, and the correcting circuit determines the interval between a plurality of corrected deadline times based on the maximum number.

In another embodiment, the initiator outputs information about the number of request data which are submitted with the same deadline time specified, and the correcting circuit determines the interval between a plurality of corrected deadline times based on the number of request data.

In another embodiment, the bus network includes at least one router which relays a packet between the initiator and the node, and a plurality of initiators, including the initiator, are connected to the bus network. A maximum number of request data which is able to be submitted with the same deadline time specified has been defined in advance for each of two or more initiators which submit request data for the packet to be relayed by the at least one router. The correcting circuit determines the interval between a plurality of corrected deadline times based on the largest one of the maximum numbers that have been defined for the two or more initiators.

In another embodiment, the header generator further stores, in the packet header, an identifier which uniquely identifies the initiator on the bus network.

In another embodiment, the header generator stores information about the corrected deadline time in the packet header but does not store any identifier which uniquely identifies the initiator on the bus network.

In another embodiment, the header generator stores, in the packet header, not only information about the corrected deadline time but also information to identify the initiator that has transmitted the request data.

In another embodiment, the node is a memory controller which connects the bus network and the memory together, and the header generator stores the corrected deadline time and information about the destination of the memory controller in the packet header.

A bus system according to another aspect of the present disclosure includes: a bus network which has been formed on an integrated circuit; an initiator which is connected to the bus network; and an interface apparatus according to any of the embodiments described above, which connects the initiator and the bus network together.

A bus system according to still another aspect of the present disclosure includes: a bus network which has been formed on an integrated circuit and includes at least one router; a plurality of initiators which are connected to the bus network; a plurality of interface apparatuses according to any of the embodiments described above, each of which connects an associated one of the initiators and the bus network together. The at least one router includes: a buffer which stores request packets which have been transmitted from each interface apparatus that is connected to an associated one of the initiators; a plurality of output ports which are connected to mutually different transmission routes; and an arbiter which provides, if multiple request packets are to be output through a particular one of the output ports, arbitration between the request packets to be transmitted through the particular output port in an order to be determined by a predetermined arbitration rule.

In one embodiment, the arbiter of the router has an arbitration rule which has been defined so that a request packet with the earliest deadline time is output sooner than any other request packet, and provides arbitration between the request packets to be transmitted through the particular output port in accordance with a plurality of corrected deadline times and the arbitration rule that are stored in each of the plurality of request packets to be output through the particular output port.

In another embodiment, the node is a memory controller which connects the bus network and the memory together, and the header generator of each interface apparatus stores the corrected deadline time and information about the destination of the memory controller in the packet header.

Embodiments of the present disclosure will now be described with reference to the accompanying drawings.

Embodiment 1

FIG. 4 illustrates the structure of an SoC 200 in which a plurality of initiators and a plurality of memories are connected together via an NoC. The SoC 200 is a semiconductor integrated circuit (chip) including a bus network 250 that uses the packet exchange method (i.e., a distributed bus network). In this SoC 200, the network 250 established on the chip connects together a plurality of initiators 201a to 201e and a plurality of memories 206a and 206b. Memory controllers 202a and 202b are also provided for those memories 206a and 206b, respectively.

Examples of the initiators 201a to 201e include a processor, a DSP (digital signal processor), a GP (graphic processor) and an IO (input/output) device.

Each of the NICs and memory controllers shown in FIG. 4 may be either an electronic circuit which has been fabricated on the chip (i.e., the SoC 200) or a companion chip which operates by being hardwired to the SoC 200. Each of those NICs can make communications using a particular physical layer and/or data link layer.

The memories 206a and 206b are storage devices to be accessed by each of those initiators 201a to 201e. Examples of the memories include a DRAM, an SRAM, and an EEPROM. On the SoC 200 formed by a mix of various initiators and memories, a mix of arbitrary bus protocol interfaces such as AXI, AHB, APB, OCP and PIF is permitted. The respective initiators and memories are connected to the packet exchange network 250 comprised of routers via NICs 203a to 203e on the initiator end, NICs 204a and 204b on the memory end, and the memory controllers 202a and 202b. Each of those NICs carries out bus protocol conversion processing adaptively to the packet exchange network 250 and interfaces the memory access data to be transmitted and received between the initiators and the memories onto the NoC bus by packetizing and de-packetizing the data.

The NICs 204a and 204b on the memory controller end de-packetize the data that has been received from the network of routers and pass the packets thus obtained to the memory controllers 202a and 202b. In addition, the NICs 204a and 204b packetize the access results gotten from the memory controllers 202a and 202b and transfer the packets over the network of routers.

In the following description, an SoC bus network according to an embodiment of the present disclosure will be described as a memory access bus on the SoC.

Portions (a) to (d) of FIG. 5 illustrate various types of packets to be transmitted and received over the NoC and their exemplary formats.

Portions (a) and (b) of FIG. 5 illustrate exemplary formats for a write request packet and a read request packet, respectively. The write request packet includes a header 51a and request data 52a. The read request packet includes a header 51b and request data 52b.

Portions (c) and (d) of FIG. 5 illustrate exemplary formats for a write response packet and a read response packet, respectively. A response packet stores data representing the result of an operation that has been performed in response to a request packet. The write response packet includes a header 51c and response data 52c. The read response packet includes a header 51d and read data 52d.

FIG. 6 illustrates an exemplary format for the packet header 51, which may include a packet ID field 51-1, a packet type field 51-2, a source field 51-3, a destination field 51-4, a deadline information field 51-5, and a data size field 51-6, for example. The header may further include fields to store any other pieces of information.

The packet ID field 51-1 stores a unique identifier (packet ID) given to each initiator to allow the NIC to check out correspondence between a request packet transmitted and its corresponding response packet. The packet ID may be used to associate a request packet with a response packet, for example.

The packet type field 51-2 stores a piece of information indicating the type of the given packet (which will be referred to herein as "packet type information" and) which may be a read request packet, a read response packet, a write request packet or a write response packet. The packet type information is used to recognize the type of the given packet which may be a memory access packet, or a read or write packet, or any of various control packets.

The source field 51-3 and the destination field 51-4 store the IDs of initiators or memories which are unique destinations for a system and which will be used by an NoC router to determine a packet transfer route.

The deadline information field 51-5 stores a value to be obtained based on the latency which is permitted until data of a response packet is replied to the initiator in response to a request packet.

The data size field 51-6 stores a piece of information about the size of the data to be read or written from/to a memory.

FIG. 7 illustrates a configuration for an NIC 203 according to the present disclosure. This NIC 203 corresponds to each of the NICs 203a to 203e on the initiator side shown in FIG. 4. It should be noted that the NICs 203a to 203e on the packet exchange network 250 have a counting counter STC (system time clock, not shown) which either can be referred to in common or is synchronized between the NICs, and which can be used to get the current time and calculate the deadline time.

The NIC 203 is connected to the packet exchange network 250. In FIG. 7, the NIC 203 is connected to an initiator 106 and to a router 107 which forms part of the packet exchange network 250. The NIC 203 receives deadline time information, along with the request data, from the initiator 106. Or the NIC 203 transmits response data to the initiator 106.

The NIC 203 includes a deadline time correcting circuit 102, a header generator 103, a packetizing processor 104, and a de-packetizing processor 105.

The deadline time correcting circuit 102 (which will be simply referred to herein as a "correcting circuit 102") detects the timings when memory access requests were submitted by the initiator 106. Then, the correcting circuit 102 corrects the deadline times of the request data so that the order of the timings of submission is maintained, thereby generating information about corrected deadline times d. More specifically, the correcting circuit 102 calculates the corrected deadline times d based on the value L of latency that the initiator 106 can tolerate and the values S indicating times when the initiator 106 submitted the requests, which can be obtained from the STC.

The header generator 103 generates a header 51 for each request packet. The header 51 generated by the header generator 103 may have the structure shown in FIG. 6. Also, the header generator 103 stores the information about the corrected deadline times d that have been generated by the correcting circuit 102 in the deadline information field 51-5. It should be noted that an ordinary router would store information indicating a deadline time that has been specified for the initiator 106 in the deadline information field 51-5.

In response to each memory access request C(i) submitted by the initiator 106, the packetizing processor 104 gets a memory address to be accessed (or the data to be written in performing a write operation) based on the header for the request packet which has been generated by the header generator 103 and the request data supplied from the initiator, thereby generating a request packet. The packet generated by the packetizing processor 104 may have the structure shown in portions (a) or (b) of FIG. 5. Then, the packetizing processor 104 transmits the request packet thus generated to the router 107.

The de-packetizing processor 105 de-packetizes the response packet (shown in portions (c) or (d) of FIG. 5) that has been received from the router 107. If the response packet turns out to be a packet responding to a write request, the de-packetizing processor 105 transmits a write status as the response data 52c to the initiator 106. On the other hand, if the response packet turns out to be a packet responding to a read request, the de-packetizing processor 105 transmits a read status and read data 52d that is the result of reading as the response data to the initiator 106. In this manner, the initiator 106 can get the access to the memory done.

FIG. 8 illustrates a configuration for a router 205, which includes a plurality of input ports 210, an arbiter 211, a buffer 212, a crossbar switch 213, and a plurality of output ports 214. Those input ports 210 and output ports 214 are input/output interface terminals. The buffer 212 may be a RAM, for example.

The router 205 shown in FIG. 8 corresponds to the router 205c shown in FIG. 4. Also, in FIG. 8, the router 205 is illustrated as receiving packets from the routers 205a and 205b and NIC 203e shown in FIG. 4 and outputting a packet to the NIC 204b.

Those input ports 210 receive packets from other routers and NICs. The packets that have been received at the input ports 210 are stored in the buffer 212, which provides two virtual channels (VCs) for each input port. A single packet is stored in each virtual channel VC. In FIG. 8, illustrated are three virtual channels in which the packets A1, B1 and B2 are respectively stored and three channels in which no packets have been stored yet.

The arbiter 211 makes reference to the destination field 51-4 of the packet header of each of the packets that are stored in the respective virtual channels VC, thereby getting information about the packet's destination. And the arbiter 211 determines whether or not there are multiple packets that should be output to the same output port in multiple different virtual channels VC. If the answer is YES, then the arbiter 211 chooses one of those packets after another following the arbitration rule to be described later.

The arbiter 211 turns the crossbar switch 213 so that the chosen packet will be output to the output port leading to its destination. In this manner, the packet can be transferred toward its destination. In the example illustrated in FIG. 8, the arbiter 211 is supposed to perform a switching control on the crossbar switch 213. However, this configuration is just an example. Alternatively, a controller (not shown) may also perform a switching control on the crossbar switch 213 instead of the arbiter 211.

The packets that have not been chosen but stay in the virtual channels VC will be offered arbitration when packets need to be transmitted next time.

Next, an arbitration rule for the router 205 according to this embodiment will be described with reference to FIG. 9. In the packet exchange network 250 shown in FIG. 4, a packet that is going from the initiator 201a toward the memory controller 202b is supposed to be routed so as to arrive at the memory controller 202b via the routers 205a and 205c. Meanwhile, a packet that is going from the initiator 201b toward the memory controller 202b is supposed to be routed so as to arrive at the memory controller 202b via the routers 205b and 205c. Furthermore, a packet that is going from any of the memory controllers to any of the initiators is supposed to be routed so as to follow the opposite route from the packet going from the initiator to the memory controller.

Portion (a) of FIG. 9 shows the relation between the timing to transmit a packet from the NIC on the initiator 201a side and its deadline time. The NIC on the initiator side 201a transmits a read request packet A1 for the memory 206b at a time T2. Its deadline time is a time T7. In portions (a) to (e) of FIG. 9, the time advances from the left to the right.

Portion (b) of FIG. 9 shows the relation between the timings to transmit packets from the NIC on the initiator 201b side and their deadline times. The NIC on the initiator side 201b transmits two read request packets B1 and B2 for the memory 206b at times T0 and T1, respectively. The deadline times of those two packets are times T8 and T9, respectively.

These packets A1, B1 and B2 arrive at the router 205c and are stored in its virtual channels VC. FIG. 8 that has already been referred to illustrates a state at a time T3 when those three request packets A1, B1 and B2 that have been stored in the VCs of the router 205c are waiting for the next output arbitration.

When there is contention between multiple packets over the same output port, the arbiter 211 compares the pieces of deadline information that are stored in the respective headers of those contending packets to each other, and applies a router arbitration rule so that the output port is allocated to the packet with the earliest deadline time first. In the following description, this embodiment will be described on the supposition that the pieces of deadline information have values representing the passage of time. For example, the deadline information may be defined so that the earlier the deadline time, the smaller the value of the deadline information and the later the deadline time, the larger the value of the deadline information. Conversely, the deadline information may also be defined so that the later the deadline time, the smaller the value of the deadline information and the earlier the deadline time, the larger the value of the deadline information. It is just a matter of design to determine which of these two methods is adopted. Nevertheless, this is not the only way of representing the deadline information and does not have to be adopted.

Portion (c) of FIG. 9 shows how the packets A1, B1 and B2 are output in this order because the arbiter 211 of the router 205c has allocated the output port to the packets so that the packet with the smallest value of deadline information may use the output port earlier than any other packet. In performing the arbitration processing at the time T3, the arbiter 211 compares to each other T7, T8 and T9 which are the respective deadline times of those packets A1, B1 and B2 that are contending with each other over the same output port through which the memory 206b can be reached. Since T7<T8<T9 is satisfied in this case, the arbiter 211 allocates the output port to the packet A1 preferentially. Consequently, the packet A1 is transferred as a result of this arbitration at the time T3. Next, in performing the arbitration processing at a time T4, the arbiter 211 allocates the output port to the packet B1, because T8<T9 is satisfied. Consequently, the packet B1 is transferred as a result of this arbitration at the time T4. Subsequently, in performing the arbitration processing at the time T5, there is no contention between multiple packets over the same output port any longer, and therefore, the arbiter 211 outputs the packet B2 through the output port.

Portion (d) of FIG. 9 indicates a timing at which the NIC on the initiator 201a side receives a response packet a1 responding to the request packet A1. Since the time delay that would otherwise be caused to those packets that should wait within the virtual channels VC has been cut down by making a router on the transfer route compare the pieces of deadline information to each other, the response packet a1 responding to the request packet A1 can arrive at the initiator 201a earlier than the time T7 that is its deadline time. That is to say, the initiator 201a can get access to the memory done before the deadline time.

Portion (e) of FIG. 9 indicates a timing at which the NIC on the initiator 201b side receives response packets b1 and b2 responding to the request packets B1 and B2. Both of these two response packets b1 and b2 can arrive at the initiator 201b earlier than their deadline times T8 and T9. That is to say, the initiator 201b can get access to the memory done before the times T8 and T9. As can be seen, by providing arbitration in the order of transferring packets by comparing the pieces of deadline information to each other so that a packet with the closest deadline time is transferred earlier than any other packet, the latency requests that vary from one initiator to another can be satisfied.

Portion (a) of FIG. 10 shows how the NIC on the initiator 201a side is submitting four access request packets A1, A2, A3 and A4 for the same memory 206b. The deadline times of the respective packets are respectively T1, T2, T3 and T4, which are supposed to satisfy T1<T2<T3<T4.

Portion (b) of FIG. 10 indicates the timings for the router 205c to transfer the packets A1, A2, A3 and A4 to the NIC 204b. In a state where those packets A1, A2, A3 and A4 are stored in the virtual channels VC in the router 205c, the arbiter in the router 205c makes reference to the deadline information fields 51-5 in the respective headers of those packets and compares their pieces of deadline information to each other. In this manner, the initiator 201a transfers the packets from the router 205c following the order in which the requests were submitted.

Generally speaking, if an initiator has submitted multiple access requests, the responses are supposed to be obtained exactly in the order in which the initiator has submitted those requests. This is called an "in order constraint". That is to say, no deadline time associated with a preceding access should be later than a deadline time associated with a succeeding access.

That is why in a packet exchange network comprised of routers which follow the deadline time based arbitration rule, even if a router on the transfer route includes a plurality of virtual channels VC but if the deadline times are different from each other, the order in which the initiator submitted the requests is never changed.

However, the multiple requests submitted by the initiator could have the same deadline time. In that case, a problem will arise due to such a router transfer method in an NoC. Now it will be described with reference to FIGS. 11 and 12 exactly what the problem is. In the following description, the router 205c is supposed to store the packets that have been received from the router 205a in the virtual channels VC.

Portion (a) of FIG. 11 shows how four request packets A1, A2, A3 and A4 with the same deadline time Td are transmitted at times Ta1, Ta2, Ta3 and Ta4, respectively.

On the other hand, portions (a) to (d) of FIG. 12 show how the respective virtual channels VC of the router 205c operate at times Tb1, Tb2, Tb3, and Tb4. At the time Tb1, the two virtual channels respectively store two packets A1 and A2 which have been received from the router 205a. The first packet A1 is stored in the lower virtual channel and the next packet A2 is stored in the upper virtual channel.

If there is no contention between packets at any other input port, the arbiter 211 compares pieces of deadline information of the packets A2 and A1 to each other at the time Tb1. Since both of their deadline times will turn out to be a time Td as a result of the comparison, the arbiter 211 cannot apply the arbitration rule described above or determine their order of priorities, either. That is why the arbiter 211 allocates the output port to the packet A2 that is stored in the upper virtual channel VC and transfers the packet A2 (see portion (a) of FIG. 12).

At a time Tb2 corresponding to the next timing of arbitration, the arbiter 211 compares pieces of deadline information of the packets A3 and A1 to each other. Since their deadline times are the same, the arbiter 211 cannot determine their order of priorities this time, either, as in the case of the packets A1 and A2 described above, and therefore, allocates the output port to the packet A3 that is stored in the upper virtual channel VC and transfers the packet A3.

At a time Tb3 corresponding to the next timing of arbitration, the arbiter 211 also allocates the output port to the packet A4 that is stored in the upper virtual channel VC and transfers the packet A4 in quite the same way.

At a time Tb4 corresponding to the next timing of arbitration, only the packet A1 is stored in VC, and therefore, the arbiter 211 allocates the output port to the packet A1.

Portion (b) of FIG. 11 shows in what order the four packets have been transmitted from the router 205c as a result of the processing described above. As shown in portion (b) of FIG. 11, the router 205c transfers the packets in the order of A2, A3, A4 and A1. That is to say, the order in which the initiator 201a has transmitted the request packets is not observed.

Thus, in order to get the order of transmission observed by a router on the route if an initiator has transmitted a plurality of request packets with the same deadline time, according to this embodiment, a request packet's original deadline time is corrected to generate information about corrected deadline time information. And when a packet is transferred through the bus network 250, each router's arbiter provides arbitration using the corrected deadline time. In this manner, the "in order constraint" on the initiator can be satisfied.

Specifically, the NIC 203 on the initiator side (see FIG. 7) corrects the deadline times so that the group of packets that have been transmitted from the NIC on the initiator 201a side in the order shown in portion (a) of FIG. 13 are transferred over the bus network 250 in the order shown in portion (b) of FIG. 13. More specifically, the correction is made in the following manner.

Suppose the initiator 201a has submitted four request data packets A1, A2, A3 and A4 that share the same time Td in common as their deadline time as shown in portion (a) of FIG. 13. The correcting circuit 102 of the NIC 203a (see FIG. 7) corrects the value that is stored in the deadline information field 51-5 in each packet's packet header and rearranges the respective deadline times of these A1, A2, A3 and A4 at regular intervals x. In this case, the corrected deadline times are set so that the earlier a packet has been transmitted, the sooner its deadline time will come.

For example, the corrected deadline times of the request packets A1, A2, A3 and A4 may be (Td−3x), (Td−2x), (Td−x) and Td, respectively. In this case, by setting x=1, the corrected deadline times of the request packets A1, A2, A3 and A4 may be (Td−3), (Td−2), (Td−1) and Td, respectively.

Since the corrected deadline times of the packets A1, A2, A3 and A4 can be redefined in this manner so as to observe the order in which the initiator 201a has submitted the request data, it is possible to prevent the packets from being transferred in a disturbed order even if a router on the route has a plurality of VCs.

Portions (a) to (d) of FIG. 14 show how the respective virtual channels VC of the router 205c operate at the times Tb1, Tb2, Tb3, and Tb4 if the corrected deadline times have been set according to this embodiment. As a result of this processing, the packets are transferred in the same order as when they were transmitted as shown in portion (b) of FIG. 13.

Now, it will be described specifically how the correcting circuit 102 operates.

FIG. 15 shows the flow of the processing to be carried out by the correcting circuit 102.

First of all, in Step S1, the correcting circuit 102 sets a deadline time in order to generate the data of a request packet that has been submitted by the initiator. Specifically, using the value L of latency that the initiator 106 can tolerate and the value S of the time when the initiator 106 submitted the request, which can be obtained from the STC, the correcting circuit 102 calculates the deadline time d as represented by the following Equation (1):

$$d = S + L \quad (1)$$

If the deadline times d are different from one request packet to another, then the correcting circuit 102 may generate the corrected deadline time D to be stored in each request packet's packet header as in the following Equation (2):

$$D = d \quad (2)$$

Some request data may have been submitted by an initiator at different times S but may have the same deadline time d. For example, suppose an initiator is going to process a plurality of read data after all of the data have been read out from a memory by a certain time limit. In some cases, a plurality of request packets that store the request data that has been submitted by that initiator may share the same deadline time d in common. In that case, the correcting circuit 102 corrects the deadline time d that has been calculated by Equation (1), thereby generating a corrected deadline time D.

Suppose n memory access requests C(0), C(1), . . . and C(n−1) have been submitted by a bus master in this order and all of these n request packets have the same deadline time d as shown in portion (a) of FIG. 16. In that case, the correcting circuit 102 determines the corrected deadline times D(0), D(1), . . . and D(n−1) as shown in portion (b) of FIG. 16 by the following Equation (3):

$$C(i): D(i) = d - (n-1--) \times W$$

$$(\text{where } i = 0, 1, \ldots, n-1) \quad (3)$$

In Step S2, i is reset into zero.

W may be a preset fixed value or a variable value which uses a random number, for example. W may be either loaded as a parameter into the NIC 203 or set by the initiator 106 for a register in the NIC 203. To minimize the difference between the corrected deadline time D(i) and uncorrected deadline time d of every request packet, W may be fixed at one and the corrected deadline time D(n−1) assigned to the last request packet C(n−1) may be matched to the original deadline time d. However, this is just an example of this embodiment. W=1 for use in this example may either be the minimum unit of a system reference clock signal (i.e., one clock period) for use in a bus system or have been determined to be a non-dimensional value that has nothing to do with such a clock period. This is a value which has been determined in advance in using the bus network 250, for example.

The request packet to which the corrected deadline time that will come soonest is assigned is C(0). The correcting circuit 102 calculates the corrected deadline time D(0) by the following Equation (4):

$$D(0) = d - (n-1) \times W \quad (4)$$

Supposing the request packet C(0) was submitted at a time S(0), to allow the request packet to which the earliest corrected deadline time is assigned to have deadline information on and after the time when the request was submitted, the following Inequality (5) needs to be satisfied:

$$S(0) < D(0) \quad (5)$$

The following Inequality (6) can be derived from Inequality (5):

$$W < (d - S(0))/(n-1) \quad (6)$$

If the maximum number of requests that have been submitted by the initiator 106 and that share the same deadline time in common has been determined in advance, then W may also be determined by the following Equation (7) with the maximum number set to be N:

$$W = (d - S(0))/(N-1) \quad (7)$$

Also, if the deadline time d is determined by Equation (1) with respect to a series of requests that share the same deadline time in common, then W may be determined by the following Equation (8) by substituting Equation (1) into Equation (7):

$$W = ((S(0) + L) - d\ S(0))/(N-1) = L/(N-1) \quad (8)$$

Next, in Step S3, the correcting circuit 102 generates the corrected deadline time by an equation in which W that has been obtained as described above is substituted into Equation (3). Thereafter, in Step S4, i is incremented. And then by making the decision process in Step S5, the correcting circuit 102 determines whether or not the corrected deadline time has been calculated for every packet. If the answer is YES, the process ends.

Suppose in a situation where there are multiple initiators 201a through 201e on the system as shown in FIG. 4, the maximum numbers of requests that have the same deadline time in respective initiators are Na through Ne and the values of tolerable latency are La through Le. Then, the correcting circuit 102 may define N and L by the following Equations (9) and (10):

$$N = \max\{Na, Nb, Nc, Nd, Ne\} \quad (9)$$

$$L = \min\{La, Lb, Lc, Ld, Le\} \quad (10)$$

By determining W by Equation (8) using N and L that have been defined by Equations (9) and (10), the same deadline interval W can be used for every initiator and the loading process can be simplified.

Optionally, the right side of Equations (9) and (10) may be applied to only some of the initiators 201a through 201e, of which the deadline information is compared by the routers 205a through 205c on the transfer route. For example, suppose the deadline information of the initiators 201a, 201b and 201c needs to be compared by the router but the deadline information of the initiators 201d and 201e does not have to be compared because the initiators 201d and 201e do not require real-time processing. In such a situation, the correcting circuit 102 may define the maximum number N of requests that have the same deadline time and the value L of tolerable latency by the following Equations (11) and (12):

$$N=\max\{Na,Nb,Nc\} \quad (11)$$

$$L=\min\{La,Lb,Lc\} \quad (12)$$

By determining W by Equation (8) using N and L that have been defined by Equations (11) and (12), the control can also be carried out with a difference in characteristic between the initiators (such as whether the initiator requires real-time processing or not) taken into account.

The corrected deadline time that has been generated by the correcting circuit 102 as a result of the processing described above is stored by the header generator 103 in the deadline information field 51-5.

FIG. 17 shows the flow of the processing to be carried out by the header generator 103.

First, in Step S11, the header generator 103 generates the header 51 (see FIG. 6) of a request packet. Next, in Step S12, the header generator 103 gets corrected deadline time information from the correcting circuit 102. Subsequently, in Step S13, the header generator 103 stores the corrected deadline time information in the deadline information field 51-5 of the request packet header. And in Step S14, the header generator 103 transmits the request packet header to the packetizing processor 104. As a result, the packetizing processor 104 generates a request packet with that request packet header and transmits the packet over the network 250.

In addition, according to this embodiment, there is no need to provide any packet ID within a request packet header any longer. As a result, the size of the request packet header can be cut down. A packet ID is generally used to exchange a packet through an NoC. Specifically, the NIC 203 on the initiator side generates and manages a unique ID, stores that ID as a packet ID in a request packet's header, and then transmits the packet. The packet ID is used to determine, in a situation where the initiator 106 has transmitted access request packets to two different memories, which of the two memories the initiator 106 has received a response packet from, for example. According to this embodiment, the corrected deadline times will be different for every request packet that the initiator 106 has transmitted. That is why by using the corrected deadline times, the request packets and the response packets can get associated with each other even without using any packet ID.

FIG. 18 shows an exemplary format for a request packet header that uses no packet ID. Compared to FIG. 6, the size of the header has been cut down, and the transmission overhead by packetizing can also be reduced.

An interface apparatus according to an aspect of the present disclosure is applicable to a network interface controller (NIC) to be arranged between a bus and a memory on an on-chip bus at an SoC for an integral device, a general-purpose processor, or a local bus on a DSP. Also, another aspect of the present disclosure is implementable as an interfacing method and a program for controlling an interface apparatus.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. An interface apparatus which connects together an initiator that is arranged on an integrated circuit and a bus network that has been formed on the integrated circuit,
    wherein the bus network is a packet exchange type network, and is designed so that if request data specifying a deadline time has been submitted by the initiator for a node on the bus network, response data to be issued by the node in response to the request data is received by the initiator by the deadline time, and
    the interface apparatus comprises:
    a correcting circuit which corrects the deadline time of the request data according to the timing when the request data has been submitted by the initiator, thereby generating corrected deadline time information, wherein the correcting circuit calculates the corrected deadline times based on the value of latency that the initiator can tolerate and the values indicating times when the initiator submitted the request;
    a header generator which generates a packet header that stores the corrected deadline time information; and
    a packetizing processor which generates a request packet based on the request data and the packet header.

2. The interface apparatus of claim 1, wherein if the initiator has submitted a plurality of request data with the same deadline time specified, then
    the correcting circuit corrects the deadline time of each said request data so that the order of submission timings of those request data is maintained.

3. The interface apparatus of claim 2, wherein if the initiator has submitted first and second request data in this order with the same deadline time specified, then
    the correcting circuit corrects the deadline time of the first request data, thereby generating a first corrected deadline time which is earlier than the deadline that has been specified by the initiator, and corrects the deadline time of the second request data, thereby generating a second corrected deadline time which is later than the first corrected deadline time and which is either earlier than, or as early as, the deadline that has been specified by the initiator.

4. The interface apparatus of claim 3, wherein the correcting circuit adopts, as the second corrected deadline time, a time which is later than the first corrected deadline time and as early as the deadline time specified by the initiator.

5. The interface apparatus of claim 2, wherein if the initiator has submitted third request data with the same deadline time specified after having submitted the second request data,
    the correcting circuit adopts, as a third corrected deadline time that is a deadline time that has been corrected in response to the third request data that has been submitted most recently, a time that is as early as the deadline time specified by the initiator.

6. The interface apparatus of claim 5, wherein the correcting circuit generates the first, second and third corrected deadline times so that the interval between the first and second corrected deadline times becomes as long as the interval between the second and third corrected deadline times.

7. The interface apparatus of claim 6, wherein the correcting circuit adopts the first, second and third corrected deadline times so that the interval agrees with a value which has been determined in advance in the bus network.

8. The interface apparatus of claim 5, wherein the correcting circuit generates the first, second and third corrected deadline times so that the interval between the first and second corrected deadline times becomes different from the interval between the second and third corrected deadline times.

9. The interface apparatus of claim 2, wherein a maximum number of request data which is able to be submitted with the same deadline time specified has been defined in advance for the initiator, and
the correcting circuit determines the interval between a plurality of corrected deadline times based on the maximum number.

10. The interface apparatus of claim 2, wherein the initiator outputs information about the number of request data which are submitted with the same deadline time specified, and
the correcting circuit determines the interval between a plurality of corrected deadline times based on the number of request data.

11. The interface apparatus of claim 2, wherein the bus network includes at least one router which relays a packet between the initiator and the node, and a plurality of initiators, including the initiator, are connected to the bus network,
a maximum number of request data which is able to be submitted with the same deadline time specified has been defined in advance for each of two or more initiators which submit request data for the packet to be relayed by the at least one router, and
the correcting circuit determines the interval between a plurality of corrected deadline times based on the largest one of the maximum numbers that have been defined for the two or more initiators.

12. The interface apparatus of claim 1, wherein the header generator further stores, in the packet header, an identifier which uniquely identifies the initiator on the bus network.

13. The interface apparatus of claim 1, wherein the header generator stores information about the corrected deadline time in the packet header but does not store any identifier which uniquely identifies the initiator on the bus network.

14. The interface apparatus of claim 1, wherein the header generator stores, in the packet header, not only information about the corrected deadline time but also information to identify the initiator that has transmitted the request data.

15. The interface apparatus of claim 1, wherein the node is a memory controller which connects the bus network and the memory together, and
the header generator stores the corrected deadline time and information about the destination of the memory controller in the packet header.

16. A bus system comprising:
a bus network which has been formed on an integrated circuit;
an initiator which is connected to the bus network; and
the interface apparatus of claim 1, which connects the initiator and the bus network together.

17. A bus system comprising:
a bus network which has been formed on an integrated circuit and includes at least one router;
a plurality of initiators which are connected to the bus network; and
a plurality of interface apparatuses of claim 1, each of which connects an associated one of the initiators and the bus network together,
wherein each of the at least one router includes:
a buffer which stores request packets which have been transmitted from each said interface apparatus that is connected to an associated one of the initiators;
a plurality of output ports which are connected to mutually different transmission routes; and
an arbiter which provides, if multiple request packets are to be output through a particular one of the output ports, arbitration between the request packets to be transmitted through the particular output port in an order to be determined by a predetermined arbitration rule.

18. The bus system of claim 17, wherein the arbiter of the router has an arbitration rule which has been defined so that a request packet with the earliest deadline time is output sooner than any other request packet, and provides arbitration between the request packets to be transmitted through the particular output port in accordance with a plurality of corrected deadline times and the arbitration rule that are stored in each of the plurality of request packets to be output through the particular output port.

19. The bus system of claim 17, wherein the node is a memory controller which connects the bus network and the memory together, and
the header generator of each said interface apparatus stores the corrected deadline time and information about the destination of the memory controller in the packet header.

* * * * *